Patented Jan. 18, 1949

2,459,581

UNITED STATES PATENT OFFICE 2,459,581

RESINOUS MIXED ESTERS CONTAINING A PENTAERYTHRITOL

Frank G. Oswald, Wilmington, Del., assignor to Hercules Powder Company, Wilmington, Del., a corporation of Delaware No Drawing. Application December 20, 1944, Serial No. 569,109

14 Claims. (Cl. 260—26)

This invention relates to stable, oil-soluble, resinous mixed esters of pentaerythritol or of a polypentaerythritol, such as dipentaerythritol, with rosin acids and with certain dicarboxylic acids, and it further relates to a method of producing such esters. It also relates to coating compositions based on these esters.

Resinous esters of pentaerythritol with rosin acids and similar esters modified with maleic acid have been found capable of producing varnishes with good hardness, water resistance, and resistance to dilute alkali upon being cooked into linseed and other soft oils. The maleic-modified esters particularly permit rapid cooking of the varnish and lead to varnishes characterized by rapid drying. The properties obtained were previously obtainable only by use of tung oil.

For many purposes, however, the resins mentioned possess insufficient flexibility and, likewise, films of varnishes based thereon are insufficiently flexible. In addition, the resins are incompatible or only partly compatible with such film-forming materials as nitrocellulose and ethyl cellulose and thus cannot be used therewith except in a very limited way. Thus, it is an object of this invention to provide an improved synthetic resin which is stable, hard, and oil-soluble, and which is relatively flexible while still maintaining desired hardness. It is an object to provide an improved pentaerythritol or dipentaerythritol resin. It is a further object to provide pentaerythritol resins improved in compatibility with cellulose derivatives.

In accordance with this invention, it has now been discovered that new, stable, oil-soluble resins of improved flexibility are obtained by reacting pentaerythritol with a rosin acid and a saturated dicarboxylic acid of the alpha-omega type and of at least 9 carbon atoms in linear arrangement, in certain limited proportions, under the influence of heat until substantial completion of the reaction. The dicarboxylic acid utilized is exemplified particularly by sebacic and azelaic acids. It is used in a limited quantity no greater than 0.5 mole per mole of the rosin acid in order to obtain a useful resin of sufficiently low acid number to be suitable for coating compositions resistant to water and dilute alkali without encountering gelation in the preparation reaction.

Stated in another way, the new resin is a stable mixed ester of a pentaerythritol in which no more than 2 hydroxyls of the pentaerythritol molecule are esterified by the saturated, linear, alpha-omega dicarboxylic acid, the remaining hydroxyls being esterified substantially completely by rosin acids. Thus, with ordinary pentaerythritol, 2 or more of the hydroxyls are combined with rosin acid groups and no more than 2 hydroxyls are combined with the dicarboxylic acid groups.

In the case of dipentaerythritol, which has 6 hydroxyl groups, no more than 2 hydroxyls are combined with the saturated dicarboxylic acid, the remaining hydroxyl groups being esterified by rosin acid, although not usually completely. In any case, rosin acids will esterify at least as many hydroxyl groups as those esterified by the dicarboxylic acid. With higher pentaerythritols, such as tripentaerythritol, the same rule will be followed; i. e., no more than the 2 hydroxyl groups are esterified by the dicarboxylic acid and the rosin acid will be sufficient to esterify at least as many hydroxyls.

Additional flexibility and insurance of compatibility with nitrocellulose in all proportions may be obtained, in accordance with this invention, by further modification in which a part of the pentaerythritol used in the preparation of the new resins is replaced by glycerol or a glycol, no more than 50% of the pentaerythritol, on the basis of the hydroxyl group content, being so replaced.

The novel resins in accordance with this invention are readily dispersed in linseed oil and other drying oils upon heating therewith to form varnishes characterized by the ability to dry rapidly to a film which is hard, water-resistant, alkali-resistant, and unusually flexible for its hardness. Bodying of the oil during the varnish cooking operation is quite rapid. The new resins are also useful to provide improved adhesion, gloss, hardness, and film-building properties in coating compositions of the lacquer type, based on film-forming materials, such as nitro-cellulose, ethyl cellulose, chlorinated rubber, and the like, which dry to a film by solvent evaporation. The varnish or lacquer coating compositions prepared with the new resins are characterized by good release of volatile solvents and thinners.

The examples which follow serve to illustrate the invention by specific embodiments. Unless otherwise specified, all parts and percentages are by weight.

Example 1

A mixture consisting of 794 grams of wood rosin (color N) and 118 grams of pentaerythritol was placed in a three-liter, round-bottomed flask equipped with a thermometer, carbon dioxide inlet tube, and an air condenser. (The reagents as charged were in the mole ratio of 3:1.) The mixture was heated to 295° C. and held at 295° C. for 6 hours, at which time the acid number had dropped to 12. The temperature was then lowered to 235° C., and 88 grams of sebacic acid were added. The resulting reaction mixture was then held between 230°–240° C. for 5½ hours. The reaction mixture was then sparged at the same temperature for 1¼ hours with carbon dioxide. During both stages of reaction, sufficient carbon dioxide was permitted to enter the flask to maintain a nonoxidizing atmosphere therein. The resulting resin, after cooling, was found to have an acid number of 20, a drop melting point of 119° C., and a Lovibond color of 80 Amber plus 41 Red.

*Example 2*

A varnish was prepared by heating 500 grams of the resin prepared in accordance with Example 1 with 1,000 grams of prebodied linseed oil having a viscosity of Z—3 on the Gardner-Holdt scale to a temperature of 310° C. The mixture was held at 310° C. until the desired bodying effect had been obtained, as indicated by the formation of a gelled pill upon chilling a drop of the resin on a cold metal plate. The varnish was then cooled to 210° C. and diluted with an equal weight of Varnish Maker's petroleum hydrocarbon thinner (Varsol). Upon addition of drier solution in the quantity to incorporate 0.5% lead, 0.07% cobalt, and 0.02% calcium, based on the oil content of the varnish, the driers being in the form of tall oil salts, the varnish formed coatings which dried rapidly to a tough, hard film. Pigmentation of the varnish gave enamels characterized by good gloss and the ability to give tough, hard films.

*Example 3*

A mixture consisting of 794 grams of polymerized wood rosin (drop melting point 100.5° C.) and 118 grams of pentaerythritol was placed in a three-liter, round-bottomed flask equipped with a thermometer, a carbon dioxide inlet tube, and an air condenser. The mixture was heated to 295° C. and held at that temperature for 6 hours, at which time the acid number had dropped to 13. The temperature was then lowered to 200° C., and 88 grams of sebacic acid were added. The resulting reaction mixture was then heated to 235° C. and held between 230°–240° C. for 5½ hours. It was then sparged at the same temperature for 1¼ hours with carbon dioxide. An atmosphere of carbon dioxide was maintained in the flask throughout the preparation of the resin. Upon cooling, the resin obtained had an acid number of 20, a drop melting point of 146° C., and a Lovibond color of 80 Amber plus 13 Red.

*Example 4*

A varnish was prepared by heating 500 grams of the resin prepared in accordance with Example 3 with 1,000 grams of dehydrated castor oil to a temperature of 310° C. The mixture was held at 310° C. until the desired bodying effect had been obtained, as indicated by the formation of a gelled pill upon chilling a drop of the resin on a cold metal plate. The varnish was then cooled to 210° C. and diluted with an equal weight of Varnish Maker's petroleum hydrocarbon thinner (Varsol). Upon addition of drier solution in the quantity to incorpoarte 0.5% lead, 0.07% cobalt, and 0.02% calcium, based on the oil content of the varnish, the driers being in the form of naphthenates, the varnish formed coatings which dried rapidly to a tough, hard film. Pigmentation of the varnish gave enamels characterized by good gloss and the ability to give tough, hard films.

*Example 5*

A mixture consisting of 794 grams of polymerized wood rosin (drop melting point 100.5° C.) and 141 grams of dipentaerythritol was placed in a three-liter, round-bottomed flask equipped with a thermometer, a carbon dioxide inlet tube, and an air condenser. The mixture was heated to 295° C. and held at that temperature for 6 hours, at which the acid number had dropped to 13. The temperature was then lowered to 200° C., and 88 grams of sebacic acid were added. The resulting reaction mixture was then heated to 235° C. and held between 230°–240° C. for 5½ hours. It was then sparged at the same temperature for 1¼ hours with carbon dioxide. An atmosphere of carbon dioxide was maintained in the flask throughout the preparation of the resin. Upon cooling, the resin obtained had an acid number of 20, a drop melting point of 155° C., and a Lovibond color of 80 Amber plus 15 Red.

*Example 6*

A varnish was prepared by heating 200 grams of the resin made in accordance with Example 5 with 400 grams of linseed oil prebodied to a viscosity of Z–3 on the Gardner-Holdt scale and 200 grams of soybean oil to 310° C. and holding the mixture at that temperature until a drop placed on a cold metal plate formed a gelled pill. The mixture was then cooled to 200° C. and thinned with an equal weight of petroleum hydrocarbon varnish thinner. This varnish, upon addition of driers in the manner given in Example 2, dried rapidly to a tough, glossy film with more than usual flexibility for its gloss.

*Example 7*

A mixture consitsing of 794 grams of wood rosin (color N) and 118 grams of pentaerythritol was charged into a three-liter, round-bottomed flask equipped with a thermometer, a carbon dioxide inlet tube, and an air condenser. The mixture was heated to 295° C. and held at that temperature for 6 hours, at which time the acid number had dropped to 11. The temperature was then lowered to 200° C. and 82 grams of azelaic acid were added. The resulting mixture was then heated to 235° C. and held in the range between 230°–240° C. for 5½ hours. It was then sparged at the same temperature for 1½ hours with carbon dioxide. An atmosphere of carbon dioxide was maintained throughout the reaction. The final resin on cooling was found to have an acid number of 18, a drop melting point of 125° C., and a Lovibond color of 80 Amber plus 6 Red.

*Example 8*

A vanish was prepared by heating 200 grams of the resin prepared in accordance with Example 7 with 300 grams of raw linseed oil and 100 grams of tung oil to 310° C. and holding the mixture at that temperature until a drop placed on a cold metal plate formed a gelled pill. The mixture was then cooled to 200° C. and thinned with an equal weight of petroleum hydrocarbon varnish thinner.

*Example 9*

A jacketed autoclave equipped with an agitator was charged with 340 pounds of "Hyex" rosin, prepared by heating rosin in contact with an activated nickel hydrogenation catalyst in the absence of any added material capable of reacting with the rosin until the apparent unsaturation of the rosin, as measured by thiocyanogen number, ceased to decrease further. (The resulting product, separated from the catalyst, contained a substantial proportion of dehydrogenated rosin and somewhat less hydrogenated rosin.) The charge in the autoclave was heated to 180° C. At this time, there were added 22.5 pounds of pentaerythritol and 28 pounds of dipentaerythritol. Heating was continued with agitation to 280° C., and the mixture was held at that temperature until the acid number thereof dropped to 50. The reaction mixture was then permitted to cool to 220° C., at which temperature 18.8 pounds of azelaic acid were added. Heating was continued for approximately 6 hours while the temperature gradually rose to 250° C., at which temperature the mixture was held until the acid number dropped to 25. To the molten resin so obtained, there were added 400 pounds of raw linseed oil. The resulting mixture was then heated to 290° C. and held at that temperature until a drop of the mixture formed a stiff, gelled pill on being placed on a cold metal plate. The mixture was cooled to 200° C. and diluted with 750 pounds of petroleum hydrocarbon varnish thinner (Varsol) to form a varnish capable, upon addition of the usual driers, of drying rapidly to form a very hard, tough, glossy film.

Similar results were obtained when the example was modified by completing the esterification reaction in the presence of the linseed oil; i. e., adding the linseed oil when the reacted resin mixture had an acid number of about 50. In another modification, a somewhat faster drying varnish was obtained by employing a synthetic drying oil consisting of pentaerythritol-linseed oil acid esters instead of the linseed oil. If desired, the synthetic oil may be prepared in situ in the presence of the resin by reacting pentaerythritol or a mixture of pentaerythritol and glycerol with linseed or other drying oil fatty acids.

Example 10

A jacketed autoclave equipped with an agitator was charged with 340 pounds of molten hydrogenated rosin and 67.3 pounds of pentaerythritol. The mixture was heated to 290° C. and held at that temperature until the acid number dropped to 15. The mixture was then cooled to 200° C. and at this temperature 75 pounds of sebacic acid were added. The resulting mixture was then heated to 225° C. and held at that temperature until the acid number dropped to 22. The resulting resin had a drop melting point of 115° C.

Example 11

A varnish was prepared by heating 200 grams of resin prepared in accordance with Example 10 with 300 grams of raw linseed oil and 200 grams of tung oil to 300° C. and holding the resulting mixture at that temperature until a drop of the mixture formed a stiff, gelled pill upon being placed on a cold metal plate. The mixture was then cooled to 200° C. and thinned with an equal weight of petroleum hydrocarbon varnish thinner. The resulting vanish was found to be characterized by the ability to dry rapidly to a tough, hard, glossy film, durable on outside exposure and resistant to water and dilute alkali.

Example 12

A three-liter, stainless steel beaker was charged with 750 grams of molten, polymerized wood rosin (drop melting point 102° C.) at a temperature of 170° C. Four hundred grams of pentaerythritol monoabietate were added thereto while heating the mixture over a 30-minute period to 200° C. The mixture was held at 200° C. for 1 hour, after which 100 grams of sebacic acid were added. The resulting mixture was then heated to 235° C. and held there for 30 minutes. At this time, 100 grams of ethylene glycol were added. The temperature of the resulting mixture was then brought to 220° C. and held at that temperature until the acid number of the resin resulting dropped to 10. This required about 5½ hours after addition of the ethylene glycol. The resin finally obtained had an acid number of 8.8 and a drop melting point of 104° C.

Example 13

A soft, plasticizing resin was obtained by dissolving 400 grams of resin prepared in accordance with Example 12 with 200 grams of raw castor oil, solution being obtained by heating together the resin and castor oil with agitation and slowly increasing the temperature until a homogeneous mixture resulted. At this point, the mixture was thinned with 200 grams of toluene and permitted to cool.

A lacquer was prepared by dissolving 400 grams of nitrocellulose (viscosity—½ second; nitrogen—12%) in a volatile solvent mixture consisting of 1,000 grams of butyl acetate, 1000 grams of ethyl acetate, 200 grams of butanol, 200 grams of ethanol, and 1,600 grams of toluene, and then mixing the resulting nitrocellulose solution with the previously prepared solution of resin and castor oil. This lacquer was suitable as a clear furniture lacquer and also for use as an enamel upon suitable pigmentation.

Example 14

A three-liter, stainless steel beaker was charged with 1,035 grams of molten gum rosin and 120 grams of pentaerythritol. The mixture was heated with stirring to 285° C. and held at that temperature until the acid number of the mixture dropped to 30. The temperature of the mixture was then lowered to 230° C. and there were added 93 grams of azelaic acid and 50 grams of ethylene glycol. The mixture was brought back to a temperature of 230° C. and held at that temperature until the acid number dropped to 10. The resin, upon cooling, was found to have a drop melting point of 95° C.

Example 15

A lacquer was prepared by dissolving 400 grams of nitrocellulose (viscosity—½ second; nitrogen—12%), 400 grams of resin prepared in accordance with Example 14, 100 grams of heat-bodied castor oil, 50 grams of tricresyl phosphate, and 50 grams of dibutyl phthalate in a solvent mixture consisting of 200 grams of ethanol, 200 grams of butanol, 1,600 grams of toluene, 1,000 grams of butyl acetate, and 1,000 grams of ethyl acetate.

Example 16

A jacketed autoclave equipped with an agitator was charged with 850 pounds of wood rosin and 145 pounds of pentaerythritol. The mixture was heated to 290° C. and held at that temperature until the acid number dropped to 20. The mixture was cooled to 220° C. and there were added 45 pounds of glycerol and 188 pounds of azelaic acid. The resulting mixture was heated to 240° C. and held at that temperature until the acid number dropped to 11. Upon cooling, the final resin was found to have an acid number of 10 and a drop melting point of 108° C.

As shown by the foregoing examples, the new resins in accordance with this invention may be prepared by heating together the rosin (rosin acid) with the pentaerythritol to form an ester in which a part of the pentaerythritol hydroxyls is esterified by the rosin acid, and then reacting this intermediate product with the saturated long-chain alpha-omega dicarboxylic acid. The initial esterification may be carried out at a temperature between about 250° C. and about 310° C., and preferably at a temperature between 285° C. and 300° C. The second step, involving reaction with dicarboxylic acid, may be carried out at a temperature between about 200° C. and about 275° C., and is preferably carried out at a temperature between 225° C. and 245° C. This general procedure is equally applicable whether pentaerythritol or a polypentaerythritol, such as dipentaerythritol, is utilized.

The new resin may also be prepared by reversing the procedure outlined in the examples by reacting the pentaerythritol first with the dicarboxylic acid at a temperature of 200°–275° C. and then, at any time prior to gelation, where such may occur, adding the rosin or rosin acid and completing the esterification at a temperature of 250°–310° C., preferably 250°–280° C. The resin may also be prepared by mixing all of the reactants, preferably first heating the rosin or rosin acid sufficiently to melt it, and heating the reaction mixture, preferably slowly, to 250°–310° C., preferably 280°–300° C., and maintaining the temperature until esterification has been substantially completed. Regardless of the order of reaction, the components of the reaction mixture are finally heated together until substantial completion of the reaction. The reaction is regarded as substantially complete either when the acid number ceases to drop measurably or when the acid number has reached a figure below 30. Preferably, the reaction mixture is heated until the acid number of the final resin is between about 5 and about 20.

As shown by the examples, either pentaerythritol or dipentaerythritol, or a mixture of the two, is suitable as the pentaerythritol. It will be understood that the term "a pentaerythritol" includes pentaerythritol itself, pentaerythritol being a completely symmetrical tetrahydroxy alcohol, and the group of compounds known as polypentaerythritols comprising dipentaerythritol, which is a hexahydric alcohol believed formed by condensation of 2 pentaerythritol molecules in ether linkage, the octahydric alcohol, tripentaerythritol, believed to be formed by linkage of 3 pentaerythritol molecules, tetrapentaerythritol, which is believed to bear a similar relationship, and other related polyhydroxy compounds normally found in small proportions in crude pentaerythritol. These compounds are all capable of esterification with rosin to form substantially neutral, oil-soluble, water-insoluble esters.

The examples illustrate preparation of the new resin with rosin, hydrogenated rosin, dehydrogenated rosin, and polymerized rosin as the source of the rosin acid. Rosin is composed chiefly of acidic components known as rosin acids, and, accordingly, rosin represents an economical form of the rosin acids utilized in this invention. Wood and gum rosin are equally suitable. However, more or less pure rosin acids isolated from rosin or modified rosin may be used instead of whole rosin. For example, crystallized abietic acid, dextro-pimaric acid, levo-pimaric acid, sapietic acid, and the like, may be utilized. Where such crystallized acids are used and where they are maintained protected from oxidation and from crystallization until esterification thereof, resins of improved color are obtained. Modified rosin, such as polymerized rosin, "Hyex" rosin (rosin treated as described in Littmann Patent 2,154,629), hydrogenated rosin, dehydrogenated rosin, disproportionated rosin, and rosin heat-treated, such as by subjection for 10 minutes to 3 hours at 250°–350° C., may also be utilized, as may be acids separated from such modified rosins. Resins of the highest melting point are obtained when polymerized rosin or polymerized rosin acids are utilized. Resins of excellent color and best stability are obtained when hydrogenated rosin is used. Melting points will be slightly lower for hydrogenated rosin resins than for those prepared from ordinary rosin. It will be understood that in referring to a rosin acid, the term includes any of the rosin acids and, in most cases, refers to a mixture of very similar chemical individuals.

The saturated dicarboxylic acid used is illustrated in the examples of sebacic and azelaic acids. However, any saturated or substantially saturated long-chain acid of the alpha-omega dicarboxylic type may be utilized, provided that it has a chain of at least nine carbon atoms from carboxyl to carboxyl, including the two carboxyl carbons. A linear chain of at least nine carbons is necessary to obtain the desired flexibility characteristics in the final resin, as compared with use of such acids as maleic acid, fumaric acid, succinic acid, and adipic acid. Nonfunctional substituent groups are not precluded as long as they do not interfere with the long carbon chain. While sebacic and azelaic acids are the preferred acids for economic reasons and for reactivity, longer-chain acids, such as brassilic acid, thapsic acid, and japanic acid, which has nineteen carbon atoms (twenty-one carbon atoms including the carboxyl carbons), have been found suitable. It will be realized that such acids react more slowly and, in general, do not give resins of as low an acid number as do sebacic and azelaic acids.

As has been pointed out, the resins in accordance with this invention will, in all cases, be prepared using as a maximum 0.5 mole of the dicarboxylic acid for each mole of rosin acid. Thus, in all cases, there will be, at a very minimum, as many rosin acid groups as dicarboxylic acid groups, based on equivalence with hydroxyl groups reactive therewith. The requirement mentioned is essential to prevent gelation to infusible or oil-insoluble forms before substantial completion of the esterification reaction. Substantial completion of esterification is considered to have been achieved when the acid number has reached about 25 or, at the most, 30. Thus, when 1 mole of wood rosin acid is reacted with 0.5 mole of dicarboxylic acids, such as sebacic and azelaic acids, and with pentaerythritol in a quantity 10% in excess of the equivalent of the acids, the mixture can be reacted to an acid number of about 25, say, 25–28, without encountering gelation. If a lower acid number is desired where gelation is about to take place, as shown by thickening of the mixture, a small amount of an aliphatic amine, preferably morpholine or butylamine, in a quantity of 1% to 2% of the reaction mixture, may be added and the reaction continued. A maximum limit of 0.5 mole is also essential for formation of a hard resin of the type desirable for handling in the preparation of varnishes. As little as 0.05 mole of dicarboxylic acid for each mole of rosin acid brings about improved flexibility of the resin. In most cases, a relatively small quantity, such as between 0.1 and 0.3 mole, of the dicarboxylic acid will be used per mole of rosin acid.

The maximum of 0.5 mole of dicarboxylic acid per mole of rosin may be used in the esterification of pentaerythritol. In such esterification, neglecting the effect of an excess of pentaerythritol, there can thus be esterification of a maximum of 2 of the pentaerythritol hydroxyl groups with the dicarboxylic acid and esterification of the remaining 2 or more hydroxyls with rosin acid. In the case of a polypentaerythritol, such as dipentaerythritol or tripentaerythritol, the dicarboxylic acid will be in a quantity to react with no more than 2 of the hydroxyls, rosin being used in a greater equivalent amount; i. e., more than sufficient to react with 2 hydroxyl groups. Thus, dipentaerythritol may be reacted with about 4 to about 5.9 moles of rosin acid (preferably from about 4 to about 5 moles) and then reacted with the saturated dicarboxylic acid in an amount to combine with from about 50% to about 100% of the remaining 2 hydroxyls.

Likewise, in the case of tripentaerythritol, no more than the 2 hydroxyls will be reacted with the dicarboxylic acid. Thus, 1 mole of tripentaerythritol may be reacted with 6 or more moles of rosin acid, leaving at least 0.1 mole of unreacted hydroxyls and then the remaining 2 or less hydroxyls may be reacted with the saturated dicarboxylic acid to combine with from about 50% to about 100% of the average free hydroxyls remaining. Likewise, simple pentaerythritol may be reacted with from about 2 to about 3.9 moles of rosin and the remaining hydroxyls reacted to the extent of about 50% to about 100% with the saturated dicarboxylic acids; i. e., 0.1 to 2 hydroxyls reacted.

It may be stated as a general rule that the resinous esters in accordance with this invention are mixed esters of a pentaerythritol with a rosin acid and a dicarboxylic acid of the alpha-omega type with at least 9 carbon atoms in which the rosin acid is combined with all except from about 0.1 of the hydroxyl group to about 2 of the hydroxyl groups presented by the pentaerythritol, and the dicarboxylic acid is combined with from about 50% to about 100% of the hydroxyl groups of the pentaerythritol which are unoccupied by the rosin acid. Where a mixture of pentaerythritols is utilized, the dicarboxylic acid will always be less than 0.5 mole per mole of rosin acid and will be only sufficient to react with a maximum of 2 hydroxyls of each of the alcohol molecules; it will always be less than a quantity causing gelation before the acid number of the reaction mixture reaches 30.

A polyhydric alcohol having less than 4 hydroxyls may be used in the preparation of the resins to replace a part of the pentaerythritol. However, the maximum quantity used will be a quantity such that it represents 50% of the total reactive alcohol hydroxyls presented, as, otherwise, the desirable properties of the pentaerythritol resin, such as high melting point, water and alkali resistance, rapid bodying in varnish making, and rapid drying, are lost. Thus, such polyhydric alcohols as glycerol, trihydroxy butane, and the various glycols, such as ethylene glycol, diethylene glycol, triethylene glycol, hexaethylene glycol, nonaethylene glycol, propylene glycol, trimethylene glycol, butylene glycol, and the like, may be used in a quantity such that they provide 0%-50% of the total hydroxyls esterifiable by the rosin and dicarboxylic acid, or 0%-100% of the hydroxyls of the pentaerythritol.

The glycol- and glycerol-modified resins in accordance with this invention have increased flexibility as compared with the unmodified resins and moderately lower melting points. They are further characterized by improved compatibility with film-forming materials of the type characterized by the ability to deposit durable, flexible, self-supporting films upon evaporation of solution thereof. The unmodified resins are compatible with such materials, as a rule, to a limited extent above which films lose some of their flexibility and tend to be hazy. The modified resins are, in general, completely compatible with cellulose derivatives, such as nitrocellulose, ethyl cellulose, benzyl cellulose, and also with chlorinated rubber.

In preparing the resins in accordance with this invention, the pentaerythritol will be used in a quantity at least equivalent to the acids utilized; i. e., in a quantity equivalent to from about 100% to about 130% of the equivalent of the total acid groups present. Preferably, the quantity will be an equivalent of 110% to 120% of the total acid groups. The same rule applies for a mixture of a pentaerythritol with other alcohols.

As shown by the examples, the resins in accordance with this invention are readily soluble in drying oils to form valuable varnishes. They may be cooked into such drying oils as linseed oil, dehydrated castor oil, soybean oil, perilla oil, oiticica oil, menhaden oil, teaseed oil, sunflower seed oil, tung oil, pentaerythritol esters of acids derived from drying oils, such as those mentioned, and the like. They are also, in general, soluble in, or compatible with, nondrying oils, such as castor oil. Likewise, they are soluble in, or compatible with, petroleum solvents and various petroleum fractions of an oily nature.

Varnishes in accordance with this invention are readily prepared by dispersing the resin, with or without aid of mutual volatile solvents, in drying oils. Usually, such dispersion is carried out in hot oils before or after bodying thereof to the desired extent for good flow properties. A preferred method comprises heating the resin with raw or prebodied drying oil at a temperature of 260°-330° C. until a mixture of the desired body is obtained. This can readily be determined with experience by the viscosity of the mixture, its tendency to string, and by the property of forming a gelled pill upon cooling on a cold metal plate. Usually, the varnish is thinned with a volatile hydrocarbon, such as benzene or toluene, or, preferably, with the more economical petroleum hydrocarbon varnish thinners.

The invention includes, broadly, coating compositions comprising, or based on, the resins described. Thus, it includes lacquers in which the resin is dissolved with a film-forming material in a mutual volatile solvent with or without the addition of plasticizers, dyes, pigments, waxes, and other agents commonly used in lacquers.

The resins in accordance with this invention have the advantage of imparting to films of coating compositions a flexibility in excess of that normally obtainable with hard, water-resistant, alkali-resistant resins. The combination of hardness with this additional flexibility results in an improved toughness of film. In addition, the resins have the very desirable characteristic of rapid solvent release. This characteristic permits films to dry to a hard, nontacky condition and establishes an early stability of film properties.

This is a continuation-in-part of my copending application, Serial No. 389,743, filed April 22, 1941, now abandoned.

What I claim and desire to protect by Letters Patent is:

1. A stable, oil-soluble, resinous mixed ester of a pentaerythritol esterified with only a rosin acid and sebacic acid, said rosin acid being combined with all except from 0.1 to 2 of the hydroxyl groups presented by the pentaerythritol and the sebacic acid being combined with 50% to 100% of the remaining hydroxyl groups.

2. A stable, oil-soluble, resinous mixed ester of pentaerythritol esterified with only hydrogenated rosin and sebacic acid, the sebacic acid being in a quantity between 0.05 mole and 0.5 mole per mole of acid in the hydrogenated rosin and the acids being substantially completely esterified by the pentaerythritol.

3. A stable, oil-soluble, resinous mixed ester of a pentaerythritol esterified with only a rosin acid and azelaic acid, said rosin acid being combined with all except from 0.1 to 2 of the hydroxyl groups presented by the pentaerythritol and the azelaic acid being combined with 50% to 100% of the remaining hydroxyl groups.

4. A stable, oil-soluble, resinous mixed ester of pentaerythritol esterified with only polymerized rosin and azelaic acid, the azelaic acid being in a quantity between 0.05 mole and 0.5 mole per mole of acids in the polymerized rosin (the rosin acids being calculated as monocarboxylic) and the acids being substantially completely esterified by the pentaerythritol.

5. A stable, oil-soluble, resinous ester of a mixture of pentaerythritol and ethylene glycol in which the pentaerythritol is in a quantity to provide above 50% of the total hydroxyls presented, esterified with only rosin and azelaic acid, the azelaic acid being in a quantity between 0.05 mole and 0.5 mole per mole of acids in the rosin, the rosin being in sufficient excess over the azelaic acid to prevent gelation in the preparation of the resinous ester at any acid number above 30, the acid number of the resinous ester being below about 30.

6. A stable, oil-soluble, resinous mixed ester of a pentaerythritol esterified with only a rosin acid and a saturated alpha-omega dicarboxylic acid having a linear chain of from 9 to 21 carbon atoms, including the carboxyl carbons, and containing no functional group other than the carboxyl groups, said rosin acid being combined with all except from 0.1 to 2 of the hydroxyl groups presented by the pentaerythritol and said dicarboxylic acid being combined with 50% to 100% of the remaining hydroxyl groups.

7. A stable, oil-soluble, resinous mixed ester of dipentaerythritol esterified with only a rosin acid and a saturated alpha-omega dicarboxylic acid having a linear chain of from 9 to 21 carbon atoms, including the carboxyl carbons, and containing no functional group other than the carboxyl groups, said rosin acid being combined with all except from 0.1 to 2 of the hydroxyl groups presented by the dipentaerythritol and said dicarboxylic acid being combined with 50% to 100% of the remaining hydroxyl groups.

8. A stable, oil-soluble, resinous mixed ester of pentaerythritol esterified with only a rosin acid and a saturated alpha-omega dicarboxylic acid having a linear chain of from 9 to 21 carbon atoms, including the carboxyl carbons, and containing no functional group other than the carboxyl groups, said rosin acid being combined with all except from 0.1 to 2 of the hydroxyl groups presented by the pentaerythritol, said dicarboxylic acid being in a quantity between 0.05 mole and 0.5 mole per mole of rosin acid, and the acids being substantially completely esterified by the pentaerythritol.

9. A stable, oil-soluble, resinous mixed ester of a pentaerythritol esterified with only polymerized rosin and a saturated alpha-omega dicarboxylic acid having a linear chain of from 9 to 21 carbon atoms, including the carboxyl carbons, and containing no functional group other than the carboxyl groups, the acids of said polymerized rosin being combined with all except from 0.1 to 2 of the hydroxyl groups presented by the pentaerythritol and said dicarboxylic acid being combined with 50% to 100% of the remaining hydroxyl groups.

10. A stable, oil-soluble, resinous mixed ester of a pentaerythritol esterified with only hydrogenated rosin and a saturated alpha-omega dicarboxylic acid having a linear chain of from 9 to 21 carbon atoms, including the carboxyl carbons, and containing no functional group other than the carboxyl groups, the acids of said hydrogenated rosin being combined with all except from 0.1 to 2 of the hydroxyl groups presented by the pentaerythritol and said dicarboxylic acid being combined with 50% to 100% of the remaining hydroxyl groups.

11. A stable, oil-soluble, resinous ester of a mixture of a pentaerythritol and a polyhydric alcohol of less than 4 hydroxyls containing no other functional group, in which the pentaerythritol is in a quantity to provide above 50% of the total hydroxyls presented, esterified with only a rosin acid and a saturated alpha-omega dicarboxylic acid having a linear chain of from 9 to 21 carbon atoms, including the carboxyl carbons, and containing no functional group other than the carboxyl groups, said dicarboxylic acid being in a quantity between 0.05 mole and 0.5 mole per mole of rosin acid, the rosin acid being in sufficient excess over the dicarboxylic acid to prevent gelation of the resinous ester in its preparation reaction at any acid number above 30, the acid number of the resinous ester being below about 30.

12. A stable, oil-soluble, resinous ester of a mixture of pentaerythritol and a glycol containing no functional group other than hydroxyl, in which the pentaerythritol is in a quantity to provide above 50% of the total hydroxyls presented, esterified with only a rosin acid and a saturated alpha-omega dicarboxylic acid having a linear chain of from 9 to 21 carbon atoms, including the carboxyl carbons, and containing no functional group other than the carboxyl groups, said dicarboxylic acid being in a quantity between 0.05 mole and 0.5 mole per mole of rosin acid, the rosin acid being in sufficient excess over the dicarboxylic acid to prevent gelation of the resinous ester in its preparation reaction at any acid number above 30, the acid number of the resinous ester being below about 30.

13. A method for the preparation of stable, oil-soluble resins which comprises heating a pentaerythritol and 0%–100% thereof (based on the hydroxyl group content) of a polyhydric alcohol of less than 4 hydroxyls containing no other functional group, with a rosin acid and with a saturated alpha-omega dicarboxylic acid having a linear chain of from 9 to 21 carbon atoms, including the carboxyl carbons, and containing no functional groups other than the carboxyl groups, at esterification temperatures, until the acids are substantially completely esterified, the reactants being in such proportion that the alcoholic hydroxyls are 100%-130% of the equivalent of the acid groups and the dicarboxylic acid is in a quantity between 0.05 mole and 0.5 mole per mole of rosin acid, the reactants employed being limited to those set forth hereinbefore.

14. A method for the preparation of stable, oil-soluble resins which comprises heating pentaerythritol with a rosin acid at a temperature between 250° C. and 310° C. and then heating the resulting product with a saturated alpha-omega dicarboxylic acid having a linear chain of from 9 to 21 carbon atoms including the carboxyl carbons and containing no functional group other than the carboxyl groups at a temperature between 200° C. and 275° C., until a resin having an acid number below about 30 is obtained, the reactants being in such proportion that the pentaerythritol is equivalent to 100%-130% of the acid groups and the dicarboxylic acid is between 0.05 mole and 0.5 mole per mole of rosin acid, the reactants employed being limited to those set forth hereinbefore.

FRANK G. OSWALD.

REFERENCES CITED

The following references are of record in the file of this patent:

UNITED STATES PATENTS

| Number | Name | Date |
|---|---|---|
| 1,667,189 | Burke et al. | Apr. 24, 1928 |
| 1,820,265 | Bent et al. | Aug. 25, 1931 |
| 2,197,855 | Ellis | Apr. 23, 1940 |
| 2,404,033 | Burrell | July 16, 1946 |

FOREIGN PATENTS

| Number | Country | Date |
|---|---|---|
| 496,444 | Great Britain | Nov. 30, 1938 |